US010113856B2

(12) United States Patent
Everett et al.

(10) Patent No.: US 10,113,856 B2
(45) Date of Patent: Oct. 30, 2018

(54) LINE-FIELD IMAGING SYSTEMS AND METHODS INCORPORATING PLANAR WAVEGUIDES

(71) Applicant: Carl Zeiss Meditec, Inc., Dublin, CA (US)

(72) Inventors: Matthew J. Everett, Livermore, CA (US); Tilman Schmoll, Dublin, CA (US); Alexandre R. Tumlinson, San Leandro, CA (US)

(73) Assignee: CARL ZEISS MEDITEC, INC., Dublin, CA (US)

( * ) Notice: Subject to any disclaimer, the term of this patent is extended or adjusted under 35 U.S.C. 154(b) by 0 days.

(21) Appl. No.: 15/025,410

(22) PCT Filed: Oct. 2, 2014

(86) PCT No.: PCT/EP2014/071149
§ 371 (c)(1),
(2) Date: Mar. 28, 2016

(87) PCT Pub. No.: WO2015/052071
PCT Pub. Date: Apr. 16, 2015

(65) Prior Publication Data
US 2016/0209201 A1 Jul. 21, 2016

Related U.S. Application Data

(60) Provisional application No. 61/888,665, filed on Oct. 9, 2013.

(51) Int. Cl.
G01B 9/02 (2006.01)
G02B 6/125 (2006.01)
G02B 6/28 (2006.01)

(52) U.S. Cl.
CPC ..... *G01B 9/02037* (2013.01); *G01B 9/02004* (2013.01); *G01B 9/02056* (2013.01);
(Continued)

(58) Field of Classification Search
CPC ............ G01B 9/02037; G01B 9/02004; G01B 9/02089; G01B 9/02091; G01B 9/02056; G02B 6/10
See application file for complete search history.

(56) References Cited

U.S. PATENT DOCUMENTS 6,564,087 B1 5/2003 Pitris et al.
7,602,501 B2 10/2009 Ralston et al.
(Continued)

FOREIGN PATENT DOCUMENTS

DE 4309056 B4 5/2006
EP 1505364 A2 2/2005
(Continued)

OTHER PUBLICATIONS

International Preliminary Report on Patentability received for PCT Patent Application No. PCT/EP2014/071149, dated Apr. 21, 2016, 7 pages.
(Continued)

Primary Examiner — Hwa Lee
(74) Attorney, Agent, or Firm — Morrison & Foerster LLP

(57) ABSTRACT

Improved line-field imaging systems incorporating planar waveguides are presented. In one embodiment the optics of the system are configured such that a line of light on the light scattering object is imaged to the planar waveguide in at least one dimension. Embodiments where the waveguide incorporates a beamsplitter of an interferometer, where the beam divider and waveguide are referenced to one or more common surfaces, and wherein the source and waveguide
(Continued)

are optically coupled, are also considered. In another embodiment, the planar waveguide is in contact or close proximity to the light scattering object.

24 Claims, 9 Drawing Sheets

(52) U.S. Cl.
CPC ..... *G01B 9/02089* (2013.01); *G01B 9/02091* (2013.01); *G02B 6/125* (2013.01); *G02B 6/2821* (2013.01)

(56) References Cited

U.S. PATENT DOCUMENTS

| 8,593,640 | B2* | 11/2013 | Kim ................ G01N 21/4795 356/497 |
|---|---|---|---|
| 9,332,902 | B2 | 5/2016 | Tumlinson et al. |
| 2010/0195048 | A1 | 8/2010 | Hammer et al. |
| 2011/0273608 | A1 | 11/2011 | Tsukada |
| 2012/0232535 | A1 | 9/2012 | Li et al. |

FOREIGN PATENT DOCUMENTS

| JP | 2001-27509 | A | 1/2001 |
|---|---|---|---|
| JP | 2003-337101 | A | 11/2003 |
| WO | 2012/118958 | A2 | 9/2012 |
| WO | 2012/143113 | A1 | 10/2012 |
| WO | 2012/162809 | A1 | 12/2012 |

OTHER PUBLICATIONS

International Search Report and Written Opinion received for PCT Patent Application No. PCT/EP2014/071149, dated Dec. 23, 2014, 9 pages.
Notice of Allowance received for U.S. Appl. No. 13/745,632, dated Dec. 18, 2015, 10 pages.
Adie et al., "Computational Adaptive Optics for Broadband Optical Interferometric Tomography of Biological Tissue", PNAS, vol. 109, No. 19, May 8, 2012, pp. 7175-7180.
Adie et al., "Interferometric Synthetic Aperture Microscopy", Biomedical Applications of Light Scattering: McGraw Hill, 2009, 43 pages.
Alexandrov et al., "Synthetic Aperture Fourier Holographic Optical Microscopy", Physical Review Letters, vol. 97, Oct. 18, 2006, pp. 168102-1-168102-4.
Blazkiewicz et al., "Signal-To-Noise Ratio Study of Full-Field Fourier-Domain Optical Coherence Tomography", Applied Optics, vol. 44, No. 36, Dec. 20, 2005, pp. 7722-7729.
Bonin et al., "In Vivo Fourier-Domain Full-Field OCT of the Human Retina with 1.5 Million A-Lines/s", Optics Letters, vol. 35, No. 20, Oct. 12, 2010, pp. 3432-3434.
Choma et al., "Sensitivity Advantage of Swept Source and Fourier Domain Optical Coherence Tomography", Optics Express, vol. 11, No. 18, Sep. 8, 2003, pp. 2183-2189.
Cuche et al., "Spatial Filtering for Zero-Order and Twin-Image Elimination in Digital Off-Axis Holography", Applied Optics, vol. 39, No. 23, Aug. 10, 2000, pp. 4070-4075.
Dändliker et al., "Reconstruction of the Three-Dimensional Refractive Index from Scattered Waves", Optics Communications, vol. 1, No. 7, Feb. 1970, pp. 323-328.
Davis et al., "Interferometric Synthetic Aperture Microscopy: Computed Imaging for Scanned Coherent Microscopy", Sensors, vol. 8, Jun. 11, 2008, pp. 3903-3931.
Davis et al., "Nonparaxial Vector-Field Modeling of Optical Coherence Tomography and Interferometric Synthetic Aperture Microscopy", Journal of the Optical Society of America A, vol. 24, No. 9, Sep. 2007, pp. 2527-2542.
Desjardins et al., "Speckle Reduction in OCT using Massively-Parallel Detection and Frequency-Domain Ranging", Optics Express, vol. 14, No. 11, May 29, 2006, pp. 4736-4745.
Devaney, A. J., "Reconstructive Tomography with Diffracting Wavefields", Inverse Problems, vol. 2, 1986, pp. 161-183.
Endo et al., "Profilometry with Line-Field Fourier-Domain Interferometry", Optics Express, vol. 13, No. 3, Feb. 7, 2005, pp. 695-701.
Fechtig et al., "Full Range Line-field Parallel Swept Source imaging Utilizing Digital Refocusing", Journal of Modern Optics, 2014, pp. 1-7.
Fechtig et al., "Line Field Off Axis Swept Source OCT Utilizing Digital Refocusing", Proc. of SPIE, 2014, 6 pages.
Fercher et al., "Image Formation by Inversion of Scattered Field Data: Experiments and Computational Simulation", Applied Optics, vol. 18, No. 14, Jul. 15, 1979, pp. 2427-2439.
Fercher et al., "Measurement of Intraocular Distances by Backscattering Spectral Interferometry", Optics Communications, vol. 117, May 15, 1995, pp. 43-48.
Fercher, Adolf F., "Optical Coherence Tomography", Journal of Biomedical Optics, vol. 1, No. 2, Apr. 1996, pp. 157-173.
Franke et al., "High Resolution Holoscopy", Proceedings of SPIE, vol. 8213, 2012, pp. 821324-1-821324-6.
Franke et al., "Towards Microscopic Resolution in Holoscopy", Proc. of SPIE, vol. 8571, 2013, pp. 85711O-1-85711O-6.
Grajciar et al, "High Sensitivity Phase Mapping with Parallel Fourier Domain Optical Coherence Tomography at 512 000 A-scan/s", Optics Express, vol. 18, No. 21, Oct. 11, 2010, pp. 21841-21850.
Grajciar et al., "High-Resolution Phase Mapping with Parallel Fourier Domain Optical Coherence Microscopy for Dispersion Contrast Imaging", Photonics Letters of Poland, vol. 3, No. 4, Dec. 31, 2011, pp. 135-137.
Grajciar et al., "Parallel Fourier Domain Optical Coherence Tomography for in Vivo Measurement of the Human Eye", Optics Express, vol. 13, No. 4, Feb. 21, 2005, pp. 1131-1137.
Grajciar et al., "Parallel Fourier Domain Optical Coherence Tomography, Measurement of the Human Eye in Vivo", Proc. of SPIE, vol. 5690, 2005, pp. 163-167.
Harduar et al., "Dual-Core Ytterbium Fiber Amplifier for High-Power 1060 nm Swept Source Multichannel Optical Coherence Tomography Imaging", Optics Letters, vol. 36, No. 15, Aug. 1, 2011, pp. 2976-2978.
Hillman et al., "Common Approach for Compensation of Axial Motion Artifacts in Swept-source OCT and Dispersion in Fourier-domain OCT", Optics Express vol. 20, No. 6, Mar. 12, 2012, pp. 6761-6776.
Hillmann et al., "Efficient Holoscopy Image Reconstruction", Optics Express, vol. 20, No. 19, Sep. 10, 2012, pp. 21247-21263.
Hillmann et al., "Holoscopy—Holographic Optical Coherence Tomography", Proc. of SPIE-OSA Biomedical Optics, vol. 8091, 2011, pp. 80911H-1-80911H7.
Hillmann et al., "Holoscopy-Holographic Optical Coherence Tomography", Optics Letters, vol. 36, No. 13, Jul. 1, 2011, pp. 2390-2392.
Huang et al., "Optical Coherence Tomography", Science, vol. 254, Nov. 2, 1991, pp. 1178-1181.
Kim, M. K., "Tomographic Three-Dimensional Imaging of a Biological Specimen Using Wavelength-Scanning Digital Interference Holography", Optics Express, vol. 7, No. 9, Oct. 23, 2000, pp. 305-310.
Kim, M. K., "Wavelength-Scanning Digital Interference Holography for Optical Section Imaging", Optics Letters, vol. 24, No. 23, Dec. 1, 1999, pp. 1693-1695.
Kim, Myung K., "Principles and Techniques of Digital Holographic Microscopy", SPIE Reviews, vol. 1, 2010, pp. 018005-1-018005-50.
Lee et al., "Line-Field Optical Coherence Tomography Using Frequency-Sweeping Source", IEEE Journal of Selected Topics in Quantum Electronics, vol. 14, No. 1, Jan./Feb. 2008, pp. 50-55.
Leitgeb et al., "Performance of Fourier Domain vs. Time Domain Optical Coherence Tomography", Optics Express, vol. 11, No. 8, Apr. 21, 2003, pp. 889-894.

(56) References Cited

OTHER PUBLICATIONS

Leith et al., "Wavefront Reconstruction with Diffused Illumination and Three-Dimensional Objects", Journal of the Optical Society of America, vol. 54, No. 11, Nov. 1964, pp. 1295-1301.
Liu et al., "Quantitative Phase-Contrast Confocal Microscope", Optics Express, vol. 22, No. 15, Jul. 2014, pp. 17830-17839.
Marks et al., "Inverse Scattering for Frequency-Scanned Full-Field Optical Coherence Tomography", Journal of the Optical Society of America A, vol. 24, No. 4, Apr. 2007, pp. 1034-1041.
Massig, Jurgen H., "Digital Off-Axis Holography with a Synthetic Aperture", Optics Letters, vol. 27, No. 24, Dec. 15, 2002, pp. 2179-2181.
Mico et al., "Basic Principles and Applications of Digital Holographic Microscopy", Microscopy: Science, Technology, Applications and Education, 2010, pp. 1411-1418.
Mujat et al., "Swept-Source Parallel OCT", Proc. of SPIE, vol. 7168, 2009, pp. 71681E-1-71681E-8.
Nakamura et al., "Complex Numerical Processing for In-Focus Line-Field Spectral-Domain Optical Coherence Tomography", Japanese Journal of Applied Physics, vol. 46, No. 4A, 2007, pp. 1774-1778.
Nakamura et al., "High-Speed Three-Dimensional Human Retinal Imaging by Line-Field Spectral Domain Optical Coherence Tomography", Optics Express, vol. 15, No. 12, Jun. 11, 2007, pp. 7103-7116.
Nakamura et al., "Optimization of Line-Field Spectral Domain Optical Coherence Tomography for in Vivo High-Speed 3d Retinal Imaging", Proc. of SPIE, vol. 6429, 2007, pp. 64291P-1-64291P-6.
Nishihara et al., "Optical Integrated Circuits", Chapter 26 of Electro-Optics Handbook 2nd Edition, 1989, pp. 26.1-26.37.
Pan et al., "A Computational Study of Reconstruction Algorithms for Diffraction Tomography: Interpolation Versus Filtered Backpropagation", IEEE Transactions on Acoustics, Speech, and Signal Processing, vol. ASSP-31, No. 5, Oct. 1983, pp. 1262-1275.
Potcoava et al., "Optical Tomography for Biomedical Applications by Digital Interference Holography", Measurement Science and Technology, vol. 19, May 23, 2008, pp. 1-8.
Ralston et al., "Interferometric Synthetic Aperture Microscopy", Nature Physics, vol. 3, Feb. 2007, pp. 129-134.
Ralston et al., "Inverse Scattering for Optical Coherence Tomography", Journal of the Optical Society of America A, vol. 23, No. 5, May 2006, pp. 1027-1037.
Ralston et al., "Real-Time Interferometric Synthetic Aperture Microscopy", Optics Express, vol. 16, No. 4, Feb. 18, 2008, pp. 2555-2569.
Rinehart et al., "Quantitative Phase Microscopy with Off-Axis Optical Coherence Tomography", Optics Letters, vol. 39, No. 7, Apr. 1, 2014, pp. 1996-1999.
Slaney et al., "Diffraction Tomography", Available at <http://proceedings.spiedigitallibrary.org/>, Retrieved on Sep. 16, 2013, pp. 2-17.
Soumekh et al., "Fourier Domain Reconstruction Methods with Application to Diffraction Tomography", Acoustical Imaging, 1984, pp. 17-30.
Soumekh et al., "Image Reconstruction from Frequency Domain Data on Arbitrary Contours", IEEE International Conference on ICASSP '84, 1984, pp. 12A.2.1-12A.2.4.
Witte et al., "Short-Coherence Off-Axis Holographic Phase Microscopy of Live Cell Dynamics", Biomedical Optics Express, vol. 3, No. 9, Aug. 22, 2012, pp. 2184-2189.
Wolf, Emil, "Three-Dimensional Structure Determination of Semi-Transparent Objects from Holographic Data", Optics Communications, vol. 1, No. 4, Sep./Oct. 1969, pp. 153-156.
Yasuno et al., "Non-Iterative Numerical Method for Laterally Superresolving Fourier Domain Optical Coherence Tomography", Optics Express, vol. 14, No. 3, Feb. 6, 2006, pp. 1006-1020.
Yasuno et al., "One-Shot-Phase-Shifting Fourier Domain Optical Coherence Tomography by Reference Wavefront Tilting", Optics Express, vol. 12, No. 25, Dec. 13, 2004, pp. 6184-6191.
Yasuno et al., "Three-Dimensional Line-Field Fourier Domain Optical Coherence Tomography for in Vivo Dermatological Investigation", Journal Biomedical Optics, vol. 11, No. 1, Jan./Feb. 2006, pp. 014014-1-014014-7.
Yu et al., "Variable Tomographic Scanning With Wavelength Scanning Digital Interference Holography", Optics Communications, vol. 260, 2006, pp. 462-468.
Yu et al., "Wavelength-Scanning Digital Interference Holography for Tomographic Three-Dimensional Imaging by Use of the Angular Spectrum Method", Optics Letters, vol. 30, No. 16, Aug. 15, 2005, pp. 2092-2094.
Zhang et al., "Adaptive Optics Parallel Spectral Domain Optical Coherence Tomography for Imaging the Living Retina", Optics Express, vol. 13, No. 12, Jun. 13, 2005, pp. 4792-4811.
Zhang et al., "Elimination of Zero-Order Diffraction in Digital Off-Axis Holography", Optics Communications, vol. 240, 2004, pp. 261-267.
Zuluaga et al., "Spatially Resolved Spectral Interferometry for Determination of Subsurface Structure", Optics Letters, vol. 24, No. 8, Apr. 15, 1999, pp. 519-521.

\* cited by examiner

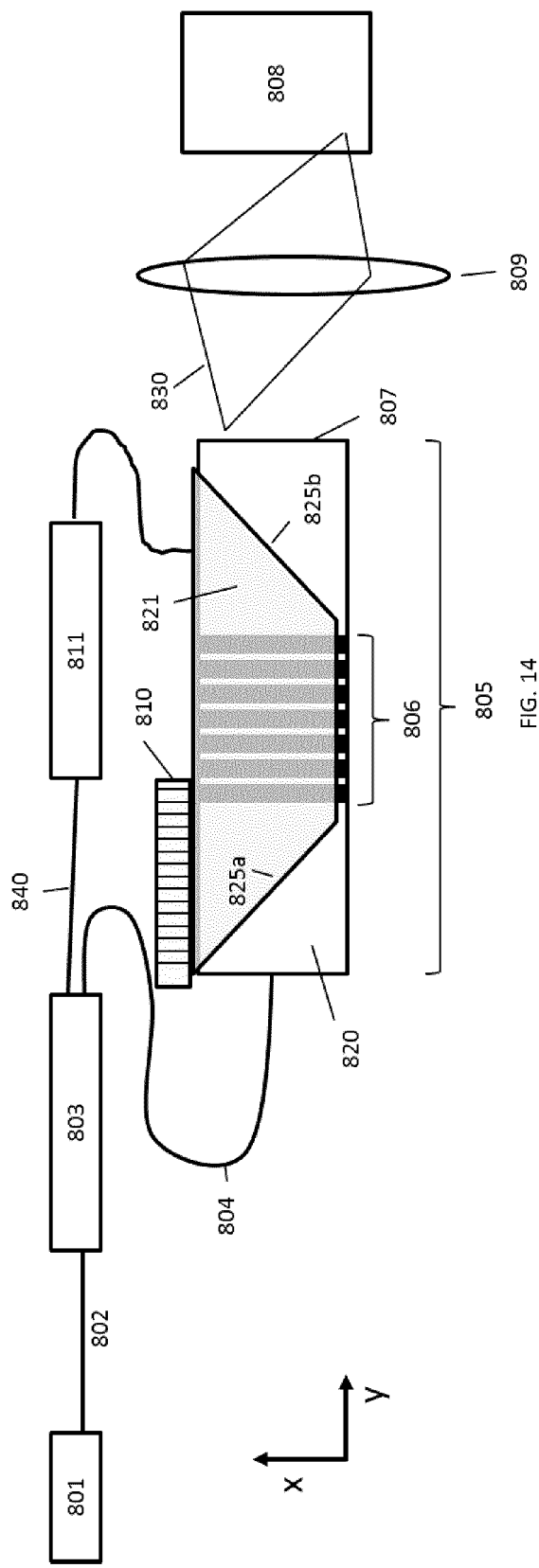

LINE-FIELD IMAGING SYSTEMS AND METHODS INCORPORATING PLANAR WAVEGUIDES

CROSS-REFERENCE TO RELATED APPLICATIONS

This application is a National Phase application under 35 U.S.C. § 371 of International Application No. PCT/EP2014/071149, filed Oct. 2, 2014, which claims priority to U.S. Provisional Patent Application No. 61/888,665, filed Oct. 9, 2013, the disclosure of each of which is hereby incorporated herein by reference in its entirety.

TECHNICAL FIELD

The present application relates to the field of line-field imaging systems, and in particular to the use of planar waveguides in line-field imaging systems.

BACKGROUND

A wide variety of interferometric imaging techniques have been developed to provide high resolution structural information in a wide range of applications. Optical Coherence Tomography (OCT) is a technique for performing high-resolution cross-sectional imaging that can provide images of samples including tissue structure on the micron scale in situ and in real time (see for example Huang et al. "Optical Coherence Tomography" Science 254 (5035): 1178 1991). OCT is an interferometric imaging method that determines the scattering profile of a sample along the OCT beam by detecting light reflected from a sample combined with a reference beam. Each scattering profile in the depth direction (z) is called an axial scan, or A-scan. Cross-sectional images (B-scans), and by extension 3D volumes, are built up from many A-scans, with the OCT beam moved to a set of transverse (x and y) locations on the sample.

Many variants of OCT have been developed where different combinations of light sources, scanning configurations, and detection schemes are employed. In time domain OCT (TD-OCT), the path length between light returning from the sample and reference light is translated longitudinally in time to recover the depth information in the sample. In frequency domain or Fourier domain OCT (FD-OCT), the broadband interference between reflected sample light and reference light is acquired in the spectral domain and a Fourier transform is used to recover the depth information. The sensitivity advantage of frequency-domain optical coherence tomography (OCT) over time-domain OCT is well established (see for example Choma et al. "Sensitivity advantage of swept source and Fourier domain optical coherence tomography," Opt. Express 11, 2183-2189, 2003 and Leitgeb et al. "Performance of Fourier domain vs. time domain optical coherence tomography," Opt. Express 11, 889-894, 2003).

There are two common approaches to FD-OCT. One is spectral domain OCT (SD-OCT) where the interfering light is spectrally dispersed prior to detection and the full depth information can be recovered from a single exposure. The second is swept-source OCT (SS-OCT) where the source is swept over a range of frequencies and detected over time, therefore encoding the spectral information in the time dimension. In traditional point scanning or flying spot techniques, a single point of light is scanned across the sample. In parallel techniques, a series of spots, a line of light (line-field), or a two-dimensional array of light (full-field) are directed to the sample. The resulting reflected light is combined with reference light and detected. Parallel techniques can be accomplished in TD-OCT, SD-OCT or SS-OCT configurations.

Several groups have reported on different line-field FD-OCT configurations (see for example Zuluaga et al. "Spatially resolved spectral interferometry for determination of subsurface structure", Optics Letters 24, 519-521, 1999; Grajciar et al. "Parallel Fourier domain optical coherence tomography for in vivo measurement of the human eye", Optics Express 13, 1131, 2005; Nakamura et al. "High-speed three-dimensional human retinal imaging by line-field spectral domain optical coherence tomography" Optics Express 15(12), 7103-7116, 2007Mujat et al. "Swept-source parallel OCT" Proceedings of SPIE 7168, 71681E, 2009; Lee et al. "Line-field optical coherence tomography using frequency-sweeping source" IEEE Journal of Selected Topics in Quantum Electronics 14(1), 50-55, 2008).

The related fields of optical diffraction tomography, holoscopy, digital interference holography, holographic OCT, and interferometric synthetic aperture microscopy (see for example Hillman et al. "Holoscopy—holographic optical coherence tomography: Optics Letters 36(13), 2390-2392, 2011; U.S. Pat. No. 7,602,501; and Kim M K "Tomographic three-dimensional imaging of a biological specimen using wavelength-scanning digital interference holography" Optics Express 7(9) 305-310, 2000) are also interferometric imaging techniques that can be accomplished in parallel and in line-field scanning configurations (see for example U.S. patent application Ser. No. 13/745,632 hereby incorporated by reference).

In a point scanning interferometric system, one typically uses single mode fibers to connect the source to the interferometer, as well as to connect the interferometer to the detection unit. These single mode fibers serve at the same time as spatial filters, which only allow the collection of a single transverse mode. Therefore all the detected light coherently contributes to the interference signal. In line-field systems, the sample is however in contrast to a point scanning OCT system illuminated by a line of light, instead of a focused spot. Through back scattering in the sample, the line of light is projected onto the detector, the imaging relations between the sample and the linear photodiode array unfortunately do not permit the light to be guided by a single mode fiber from the interferometer to the detection unit. The single mode spatial filter known from point scanning systems is therefore missing. In order to implement a spatial filter in free space optics, previously published line-field OCT systems employed a slit as a spatial filter. A slit can however only provide limited transverse mode selection, still allowing multiple transverse modes to propagate to the detector as it does not discriminate based on the angle of incidence. Therefore it is very difficult to make all the light on the detector contribute coherently to the interference fringe signal. Instead the extra modes create an incoherent background only adding to the noise but not the signal. Also a large amount of multiply scattered light may pass through the slit, which may result in a further reduction of image quality.

SUMMARY

The present application describes systems and methods to improve line-field imaging systems including but not limited to optical coherence tomography, optical diffraction tomography, holographic optical coherence tomography, holoscopy, interferometric synthetic aperture microscopy (ISAM), and digital interference holography. The systems could be polarization sensitive. In one embodiment, a single mode planar waveguide is included in an interferometric line-field imaging system in such a way that the line of light on the sample is imaged to the planar waveguide in at least one dimension. This improves mode selection and leads to improved sensitivity and lower susceptibility to multiple scattering. A planar waveguide which is single mode in one direction reduces the collection of multiple transverse modes in this direction. It will therefore maximize the fringe amplitude of an interference signal and minimize the influence of multiply scattered light. Embodiments are described in which the planar waveguide may serve as spatial filter and/or as line generating component. Embodiments where the waveguide incorporates a beamsplitter of an interferometer, where the beam divider and waveguide are referenced to one or more common surfaces, and wherein the source and waveguide are optically coupled, are also considered. In another embodiment, a planar waveguide is included in a line field interferometric imaging system wherein the planar waveguide is in contact or close proximity to the light scattering object.

BRIEF DESCRIPTION OF THE FIGURES

FIG. 3a shows the waveguides unbonded while FIG. 3b illustrates the bonded structure.

FIG. 5a illustrates an embodiment where a fiber is attached directly to a face of the structure while FIG. 5b illustrates an embodiment wherein the laser itself is connected to the structure.

FIG. 14 illustrates a linefield OCT system incorporating the planar waveguide structure of FIG. 13.

DETAILED DESCRIPTION

Improved line-field imaging systems will now be described in detail. The detailed description is largely focused on holographic line-field SS-OCT systems but as described in further detail below, the ideas described herein could be applied to any line-field imaging system. In line-field holography, the requirement for regions of asymmetric propagation on the detection side of the system introduces complexity, size, and additional degrees of alignment freedom in a system. This application provides simple, compact, and potentially well constrained means to introduce spatially asymmetric propagation into the system.

Figure 1:
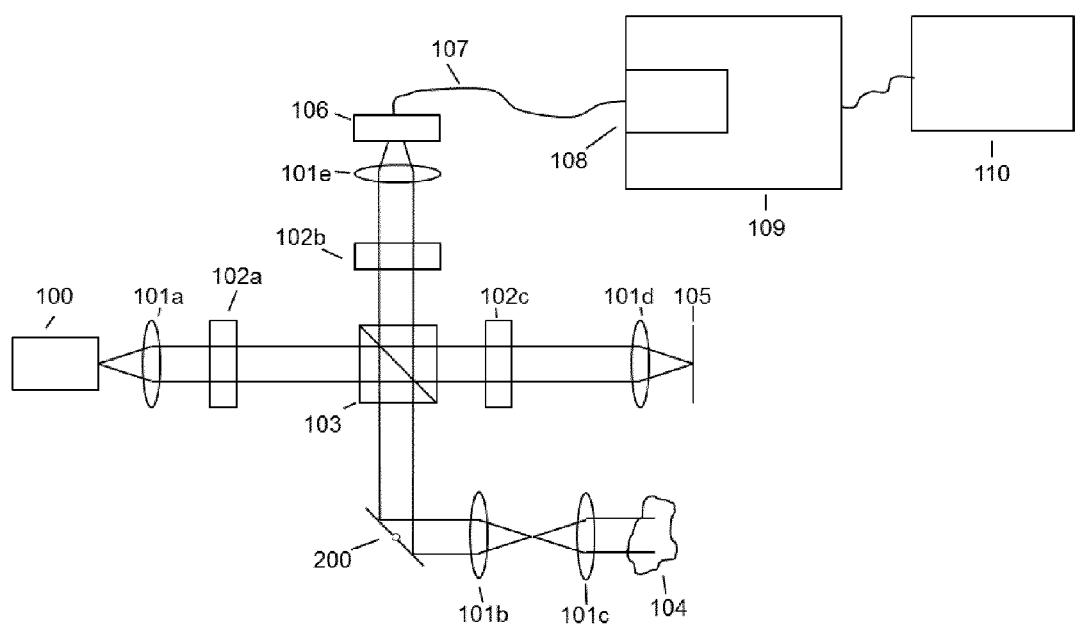
FIG. 1 shows a generalized holographic line-field SS-OCT system.

In co-pending U.S. application Ser. No. 13/745,632 hereby incorporated by reference, a line-field SS-OCT digital holography system is described. In this system, illustrated in FIG. 1, asymmetrical optical elements such as cylindrical lenses were used to achieve the goals of holographic detection in one dimension with traditional confocal constraint in the other. Light from a tunable light source (100) is collimated by a spherical lens (101a). A cylindrical lens (102a) creates a line of light from the source, and the light is split into sample arm and reference arm by a beamsplitter (103). A scanner (200) can adjust the transverse location of the line of light on the sample. A pair of spherical lenses (101b and 101c) images the line onto the sample (104). The light in the reference arm is transferred back to a collimated beam by a cylindrical lens (102c) before it is focused on a mirror by a spherical lens (101d) and reflected by a mirror (105). By the time it passes the beamsplitter (103) the second time, the reference light travelled close to the same optical path length as the sample arm light did. At the beamsplitter (103) light reflected back from the reference arm and backscattered in the sample arm is recombined and interferes with each other and the combined light is directed towards line detector (106) after passing through a lens (101e). In a holographic line-field SS-OCT system as illustrated here, the line of light on the line detector (106) is significantly defocused along the line. The additional astigmatism is introduced by a cylindrical lens (102b) in the detection path. The electrical signals from the line detector (106) are transferred to the processor (109) via a cable (107). The processor (109) may contain a field-programmable gate array (FPGA) (108), which performs some, or the entire OCT signal processing steps, prior to passing the data on to the host processor (109). The processor is operably attached to a display (110) for displaying images of the data. The sample and reference arms in the interferometer could consist of bulk-optics, fiber-optics, photonic integrated circuits (PIC) or hybrid bulk-optic systems and could have different architectures such as Michelson, Mach-Zehnder or common-path based designs as would be known by those skilled in the art. Light beam as used herein should be interpreted as any carefully directed light path.

The use of a planar waveguide as part of such a system as suggested herein provides a special case of an asymmetrical element which is particularly advantageous for holographic line-field SS-OCT. The waveguide is positioned within the system and the optical elements are configured such that a line of light on the light scattering object is imaged to the planar waveguide in at least one dimension. Because the light is constrained from propagation in the light guiding plane, but allowed in the in-plane direction, the asymmetric propagation is achieved. The use of a single mode planar waveguide in a line-field OCT system will furthermore, analogous to a single mode fiber in point scanning OCT, provide at least in one dimension, a perfect single mode selection and therefore serve in this dimension as an ideal spatial filter. There are a variety of ways one or more waveguides could be incorporated into a line-field system as will be described below.

The use of astigmatic optics and/or planar waveguides in the detection path from the sample to the detector also allows for different detection numerical apertures (NA) in each dimension. It may be desirable to collect with a low numerical aperture in the confining direction of the slit or waveguide in order to maintain a long depth range over which consistent optical efficiency is maintained. On the other hand, because numerical aperture in the long direction of the slit or waveguide does not limit the depth over which good optical efficiency may be maintained, it may be desirable to use a larger numerical aperture in order to achieve highest collection efficiency and lateral resolution in this dimension. In case different numerical apertures are used for each dimension on the sample, the potential resolution in each dimension is different. In such a case of asymmetric lateral resolution, it may be advantageous to build a system where it is possible to shift the axis of the optical assembly relative to the object, such as by insertion of a rotatable Dove prism in the imaging path, in order to collect the image data with high resolution in both dimensions when highest isotropic resolution is required.

Figure 2:
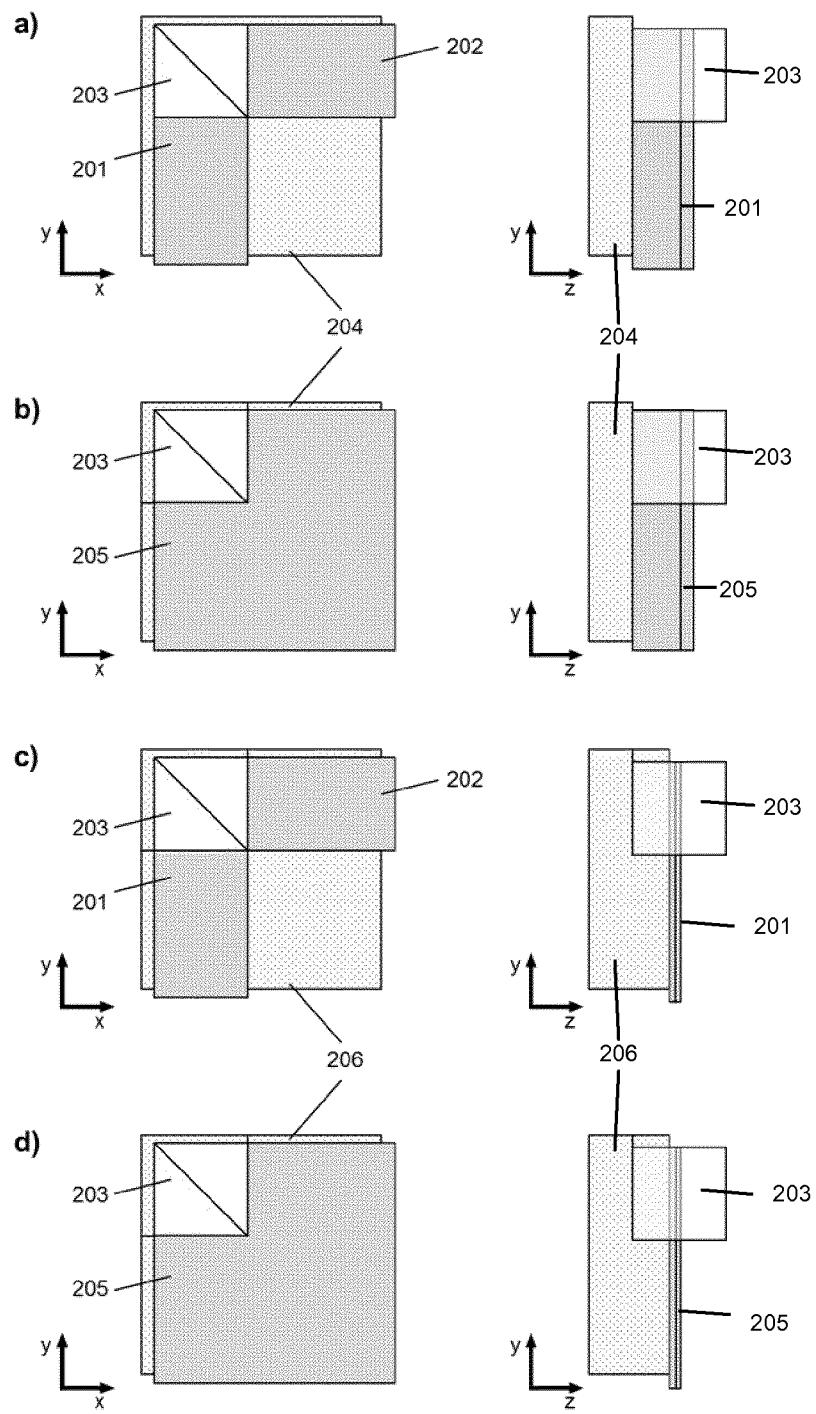
FIG. 2 illustrates four possible embodiments of waveguide beamsplitter combinations where one or more waveguides and a beamsplitter are aligned on a common carrier plate. The left hand side shows the xy-plane (horizontal) and the right side shows the yz-plane (vertical).

In one preferred embodiment, a planar waveguide is used analogously to the single mode fibers in a point scanning OCT system, wherein a waveguide is placed in both the illumination and the collection paths. This will guarantee an efficient use of light because of matching mode structures of illumination and collection. In a particular embodiment, the illumination and the collection waveguides are placed in close proximity, ideally both aligned to at least one common reference surface. FIG. 2a shows a case where the illumination and collection waveguides (201, 202) are placed on a common flat carrier plate (204). The y-x plane represents the top view (left hand side of FIG. 2), the y-z plane the side view (right hand side of FIG. 2). The light in the planar waveguide propagates in the y-x plane and is guided in the z-dimension. The common flat carrier plate serves as the first common alignment surface. The same carrier plate also holds a cube beamsplitter (203), which is in contact with both waveguides and therefore serves as a second common alignment reference. A cladding layer (207), seen in the side view, is formed on top of the waveguide layer.

Alternatively as illustrated in FIG. 2b, one may instead of two separate planar waveguides as illustrated in FIG. 2a, choose to use, one "L" shaped planar waveguide (205), where the two portions of the waveguide oriented at 90 degree to each other, would serve in practice as two separate waveguides attached on either side to beamsplitter (203). The use of practically two waveguides on the same substrate facilitates the alignment of the interferometer, because the flat substrate (204) will assure a common orientation in space. The light entering the waveguide would be arranged so that it does not spread within the waveguide (in the x direction) wider than the width of the beam splitter. FIGS. 2c and d show alternative embodiments where the beam splitter cube (203) sits on a lower surface than the planar waveguides (201, 202, 205). Both surfaces are however parallel and are therefore still serving as valid reference surfaces.

In another embodiment, a single path is used for collection and illumination. In this case a single planar waveguide could be used, but it would accomplish the same filtering benefits of having waveguides in the illumination and collection pathways as previously discussed. This arrangement may significantly simplify the alignment of the interferometer. In such an implementation, the beamsplitter may ideally be incorporated into the waveguide.

Figure 3:
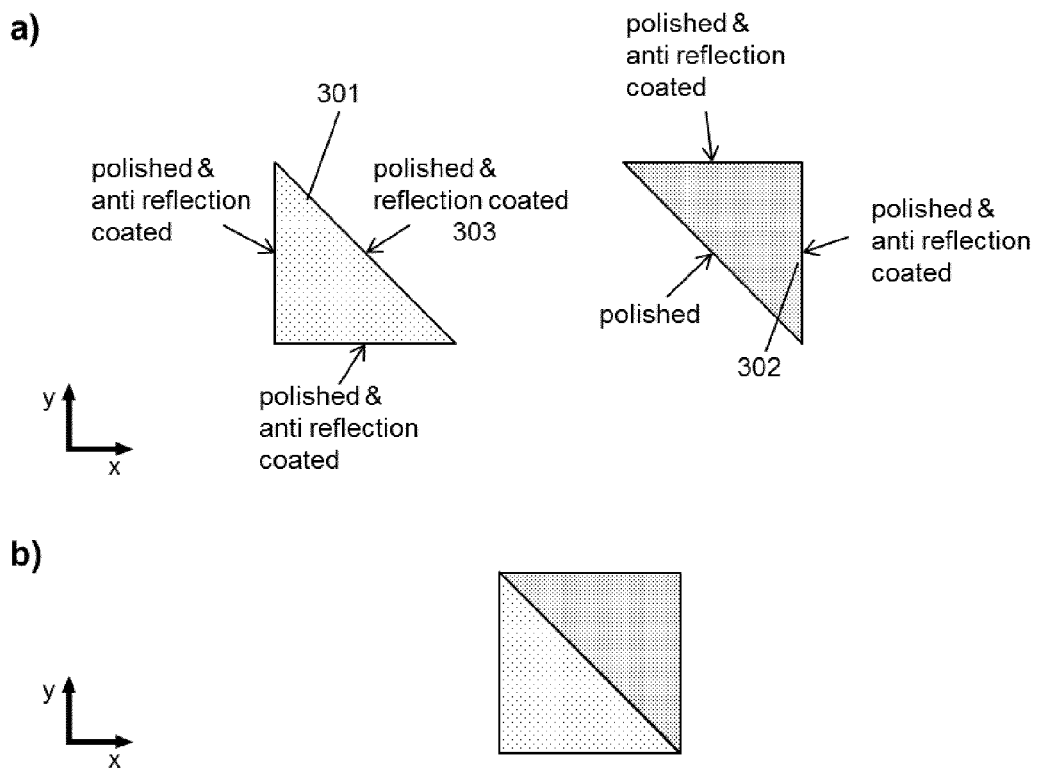
FIG. 3 illustrates an embodiment of a planar waveguide beamsplitter comprising two triangular waveguides merged at a polished and reflection coated surface.

FIG. 3 illustrates an embodiment of a planar waveguide beamsplitter structure, created by merging two planar waveguides. FIG. 3a shows the individual planar waveguides (301, 302) in the x-y plane, which are in this example isosceles right angled triangles. The external surfaces are polished and preferably anti-reflection coated. The surfaces of each triangle, which will be merged (303), are polished and at least one of the surfaces is reflection coated. Depending on the reflection and transmission properties of the coating, desired splitting ratios may be created. With polarization sensitive coatings, also polarization dependent splitting ratios may be achieved. FIG. 3b shows the two planar waveguides bonded together to form a single planar waveguide beamsplitter structure. The bonding of the two planar waveguides could for example be done by a UV radiation activated adhesive as would be known by one skilled in the art.

Figure 4:
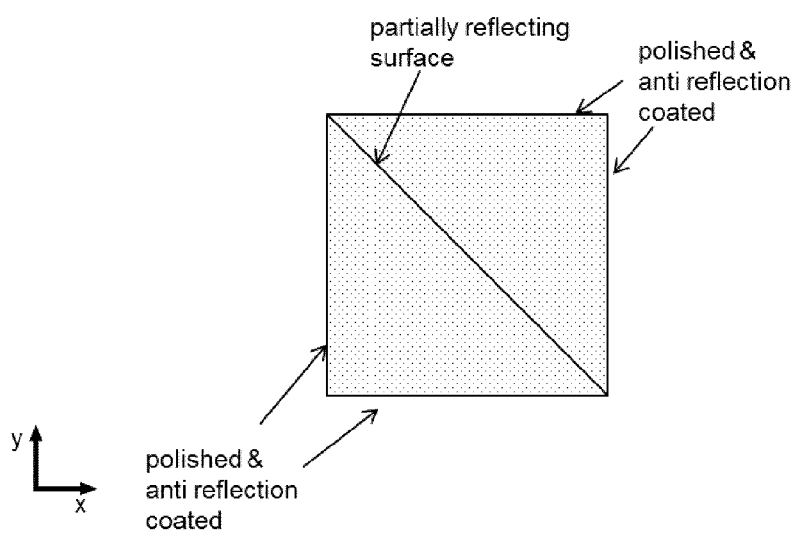
FIG. 4 illustrates a planar waveguide beamsplitter structure where a partially reflecting surface is incorporated in a single planar waveguide at an angle of 45 degrees.

FIG. 4 illustrates another embodiment of a planar waveguide beamsplitter structure. In this embodiment, the planar waveguide beamsplitter consists, in contrast to the design schematically illustrated in FIG. 3, of a single planar waveguide. Within the planar waveguide there is a partially reflecting surface incorporated at an angle of 45 degrees to accomplish beamsplitting functionality. All 4 exterior edges of the rectangular shaped waveguide are polished and preferably anti-reflection coated.

There are a variety of ways to couple light from the source into the illumination waveguide. These ways could include focusing light into the waveguide by the use of spherical or cylindrical lenses or placing the tip of a single mode fiber close to the core of the planar waveguide. In a preferred embodiment, which is schematically illustrated in FIG. 5a, a single mode fiber (501) is directly bonded to one edge of the planar waveguide (502). FIG. 5b schematically illustrates another embodiment, where a laser structure (503), for example a sample grating distributed Bragg reflector (SG-DBR) tunable laser, may be bonded directly to the illumination waveguide (504). Alternatively the laser chip (601) as well as the planar waveguide structure (602) may even be incorporated on the same substrate (603), as shown in FIG. 6.

Figure 5:
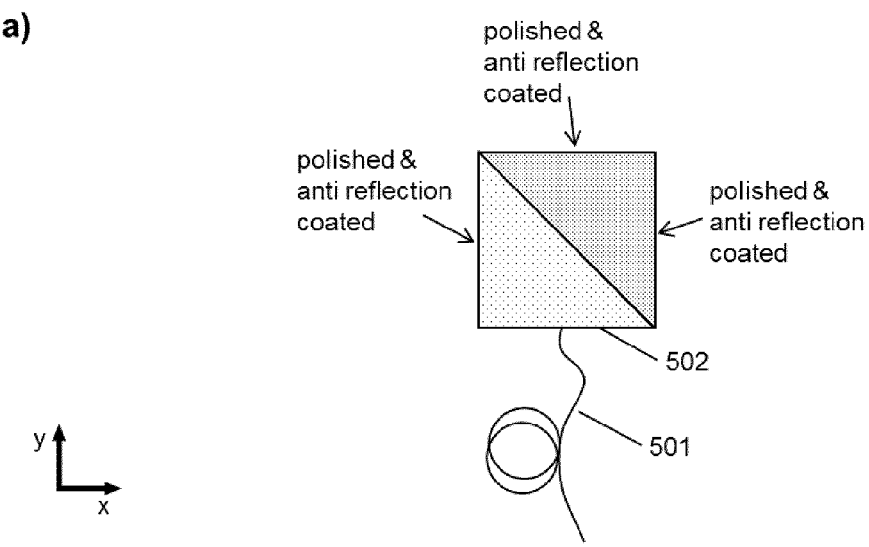
FIG. 5 illustrates two ways in which light can be coupled into a planar waveguide beamsplitter structure.
Figure 5:
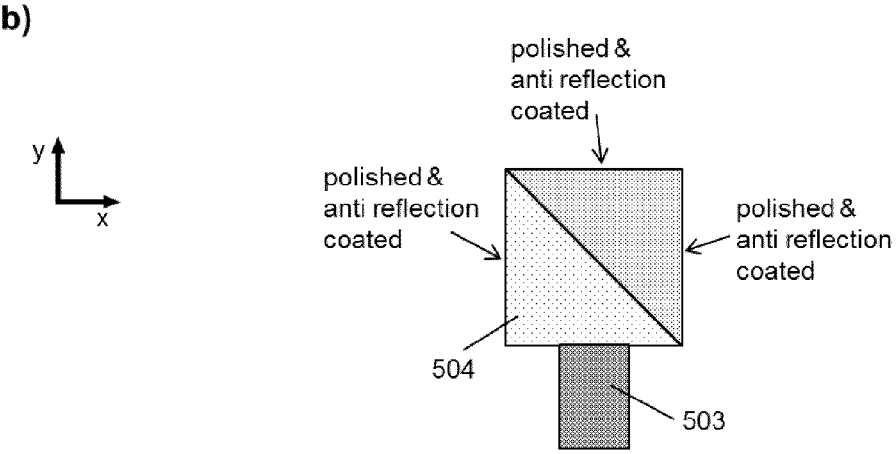
Figure 6:
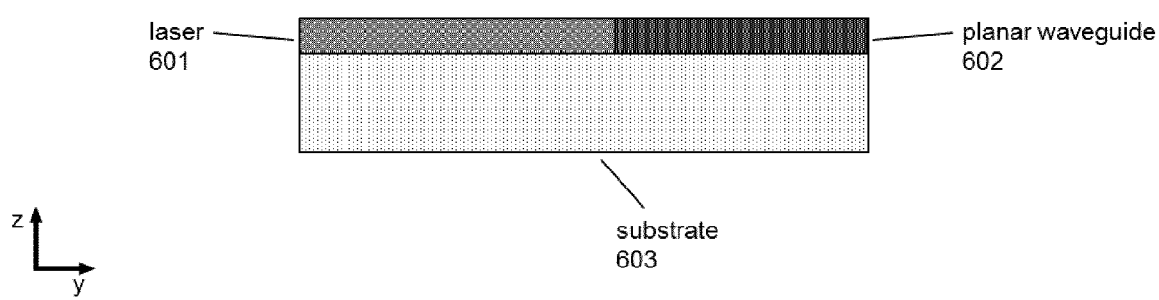
FIG. 6 illustrates an embodiment where the laser source and planar waveguide beamsplitter are mounted on a common substrate.
Figure 7:
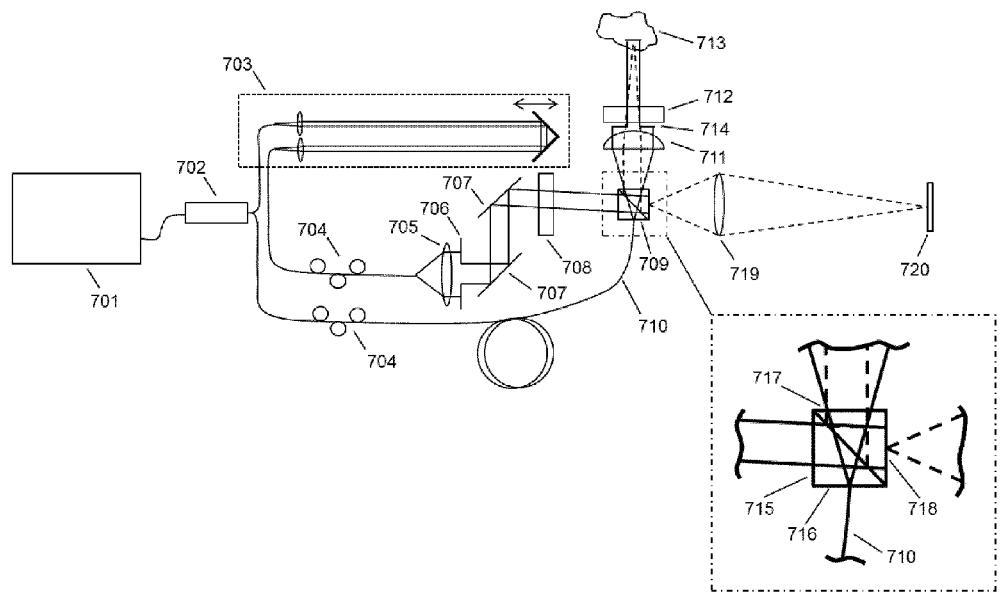
FIG. 7 shows a holographic line-field SS-OCT system incorporating a planar waveguide beamsplitter structure. The activity within the structure is shown in dashed box for increased visibility.

FIG. 7 illustrates a holographic line-field SS-OCT system including a monolithic planar waveguide beamsplitter structure such as those shown in FIG. 3, 4 or 5. Light from a swept source (701) is split into two arms, i.e. reference and sample arms, using a fiber optic beamsplitter (702). The light in the reference arm travels through a transmissive delay line (703), which is used to adjust the optical path length difference between reference and sample arms. The polarization state of the light in the reference and sample arms can be adjusted by optional fiber optic polarization controllers (704). The light in the reference arm is then collimated into the free space part of the interferometer using a collimator (705). In order to minimize the intensity variations of the line illumination, the beam can be truncated by an aperture (706). Two mirrors (707) generate an off-axis angle and direct the line through a cylindrical lens (708), which focuses the light in one dimension on an entrance edge, (reference arm edge (715)) of the planar waveguide beamsplitter (709). The dashed box in the bottom right hand corner of the figure illustrates the elements of the planar waveguide beamsplitter (709) in more detail. The sample arm fiber (710) coming from the fiber optic beamsplitter (702) is fused directly to one edge of the planar waveguide beamsplitter, defined here as fiber edge (716). After the light exits the planar waveguide splitter on the opposite side (sample arm edge (717)), it passes two cylindrical lenses (711, 712), which create a line illumination on the sample (713). Similar to the aperture in the reference arm (706), there can also be an aperture (714) in the sample arm, which truncates the line, in order to minimize the intensity variation along the illumination line. After the light is backscattered from the sample (dashed lines), it passes the same optics (712, 714, 711) again and is coupled back into the planar waveguide beamsplitter (709) at the sample arm edge (717). The optical configuration is such that a line of light on the sample is imaged to the planar waveguide in at least one dimension. In the planar waveguide beamsplitter (709), the light beams of the reference arm and the sample arm are recombined. Since the light beams travelled both approximately the same optical path length difference, they interfere and generate a hologram at the exit edge of the planar waveguide beamsplitter (detector edge (718)). The hologram is imaged with a spherical lens (719) to a linear photodetector array (720). By adding polarization optics to the above described setup, one is able to create a polarization sensitive line field system, which enables tissue characterization due to polarization contrast.

Figure 8:
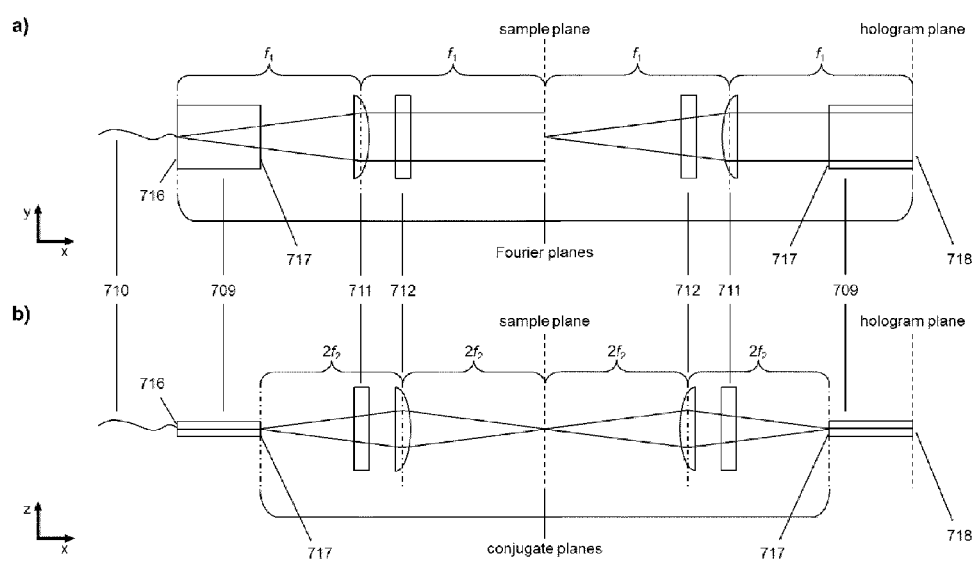
FIG. 8 illustrates an "unfolded" view of the sample light from the input fiber to the detection plane of the holographic line field SS-OCT system illustrated in FIG. 7 in the horizontal (y-x) and vertical (z-x) planes.

FIG. 8 schematically illustrates the horizontal and vertical dimensions of the sample light of FIG. 7 from the waveguide entrance in the sample illumination path to the waveguide exit in the sample collection path in more detail for the case where a point on the sample is imaged to a line on the waveguide. In this case, the illumination and collection optics are configured such that the line of light on the light scattering object is imaged to said planar waveguide in only one dimension. Cases where a point on the sample is imaged to a point on the waveguide can also be envisioned by those skilled in the art and some examples will be discussed in further detail below. In those cases, the optical configuration is such that the line of light on the object is imaged to said planar waveguide in both dimensions. The figure shows an "unfolded" view of the interferometer where the left hand side of each figure represents the illumination path while the right hand side represents the collection or detection path. The sample plane is located at the center. FIG. 8a displays the system in the horizontal (x-y) plane (i.e. top view) while FIG. 8b describes the system in the vertical (x-z) plane (i.e. side view).

The left hand side of FIG. 8a illustrates how, in the horizontal dimension, the fiber core of the fiber (710) connected to the fiber edge (716) of the planar waveguide (709) is imaged to a line on the sample based on the optical configuration. In the perpendicular dimension illustrated in the left hand side of FIG. 8b, the sample arm edge (717) of the planar waveguide (709) is imaged to a point on the sample. This generates a line of light focused onto the sample in one dimension and collimated in the other dimension. To achieve the different imaging characteristics for the two dimensions one may choose to use cylindrical lenses (711, 712). After the light is backscattered at the sample, it will travel through the same optical elements (711, 712) in the opposite order and will be coupled into the planar waveguide (709) at the sample arm edge (717). In this dimension, the line of light on the scattering object is imaged to the sample arm edge (717) of the planar waveguide. Within the planar waveguide beamsplitter the light will however be directed to a different exit edge of the waveguide by the beamsplitter located inside the planar waveguide beamsplitter structure, namely the detector edge (718). For simplicity the illustrated image path is also unfolded in FIG. 8 not showing the 90 degree folding. On this path from the sample to the detector the imaging relations will be inverted and therefore each point along the line on the sample will correspond to a line of light at the detector edge of the planar waveguide (718). With the described illumination and collection path the fiber edge (716) of the planar waveguide, the sample plane and the detector edge (718) of the planar waveguide are in the y-x plane related Fourier planes. In the z-x plane however, the sample arm edge (717) of the planar waveguide and the sample plane are conjugate planes to each other.

When a line of reference light is focused into the waveguide, as illustrated in FIG. 7, to create interference where the reference light travelled the same optical path length as the sample light, a hologram is generated. The detector edge of the planar waveguide beamsplitter represents in the case presented in FIGS. 7 and 8 the hologram plane. In order to be able to separate real and virtual images as well as DC and autocorrelation terms in the digital reconstruction process, one may in analogy to digital off-axis holography (see for example U.S. application Ser. No. 13/745,632 and Cuche et al., "Spatial filtering for zero-order and twin-image elimination in digital off-axis holography," Appl. Opt. 39, 4070-4075, 2000), choose to create an angle offset between reference and sample light in the interferometer.

To enable further digital processing of the hologram, it needs to be digitized. This may be achieved by placing a linear photodiode array in the hologram plane. In a preferred embodiment the detector edge (718) of the planar waveguide would be bonded directly to the linear photodiode array (720). In other embodiments it may however be necessary to magnify or demagnify the hologram, in order to make use of the full width of the linear photodiode array. In this case one would choose to image the detector edge (718) of the planar waveguide to the photodiode array (720) with a desired magnification or demagnification to match the size of the photodiode array.

Figure 9:
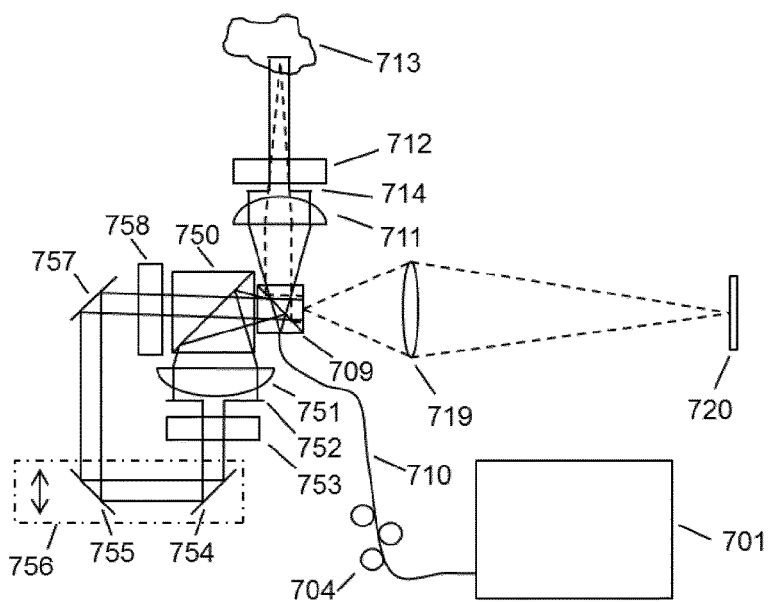
FIG. 9 illustrates an alternative embodiment of a holographic line-field SS-OCT system that includes an bulk optic reference path.

FIG. 9 schematically illustrates an alternative bulk optics reference arm design for a system as shown in FIG. 7 and described above. Since the path of the sample and detection arms is identical to the system illustrated in FIG. 7, only the path of the reference light is described here. Light coming from the swept laser (701) is coupled from a single mode fiber (710) directly into the planar waveguide beamsplitter (709), which splits it in reference and sample light. The reference light exits at the reference arm edge (715), before it passes a beam splitter (750). Light passing through the beam splitter (750) is lost and neglected here. Two cylindrical lenses (751, 752) create a collimated line of light. An aperture (752) truncates the line of light in order to minimize the intensity variation along the line. The collimated line of light then passes two folding mirrors (755, 754), which are carried by a translation stage (756). This enables the optical path length of the reference arm to be adjusted relative to the optical path length of the sample arm. Another folding mirror (757) establishes an off-axis angle. A cylindrical lens (758) focuses the line of light in one dimension on the reference arm edge (715) of the planar waveguide beam splitter, where the light is recombined with the light from sample arm. Since the light in reference and sample arms traveled approximately the same distance, it interferes with each other and generates a 1D hologram at the detector edge (718) of the planar waveguide beam splitter.

Figure 10:
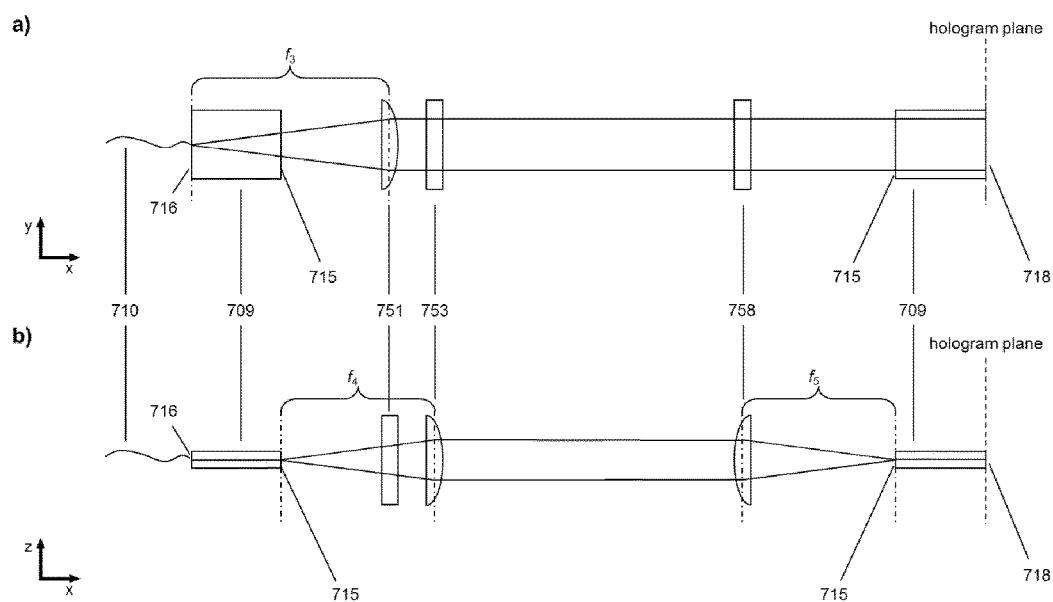
FIG. 10 illustrates an "unfolded" view of the reference light from the input fiber to the detection plan of the holographic line-field SS-OCT system illustrated in FIG. 9 in the horizontal (y-x) and vertical (z-x) planes.

FIG. 10 schematically illustrates the unfolded simplified reference light path for the system shown in FIG. 9 and described above. FIG. 10 a shows how the reference light propagates in the horizontal dimension (y-x plane) (i.e. top view) and FIG. 10 b shows how the reference light propagates in the vertical dimension (z-x plane) (i.e. side view).

Figure 11:
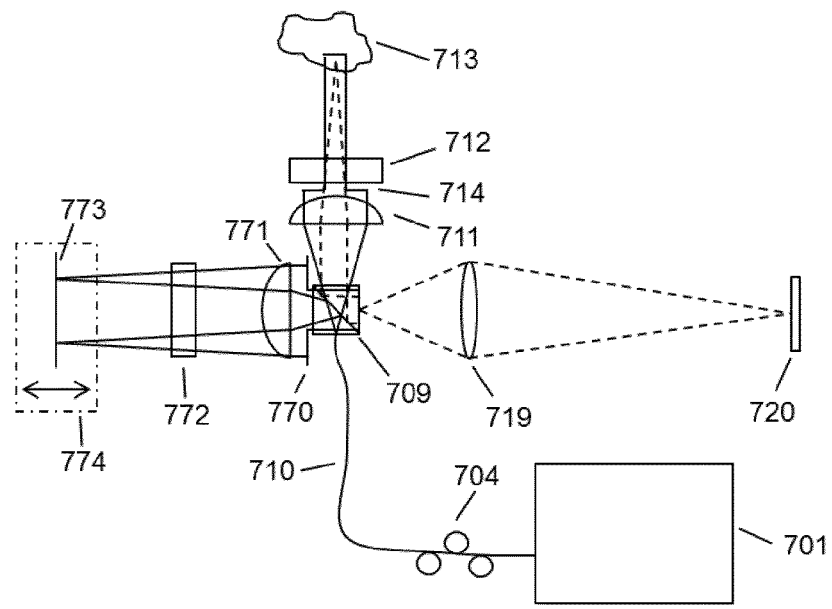
FIG. 11 shows an additional embodiment of a holographic line-field SS-OCT system that includes an alternative bulk optic reference path.

FIG. 11 schematically illustrates another alternative bulk optics reference arm design for the system as shown in FIG. 7 and described above. Again since the path of the sample and detection arms is identical to system illustrated in FIG. 7, only the path of the reference light is described here. Light coming from the swept laser (701) is coupled from a single mode fiber (710) directly into the planar waveguide beamsplitter (709), which splits it in reference and sample light. The reference light exits at the reference arm edge (715). Cylindrical lens (771) will collimate the light in one dimension only in a double pass configuration. Cylindrical lens (772) collimates the light by a single pass. The light is therefore collimated in one dimension and still slightly diverging in the other dimension, when it is back-reflected by mirror (773). Mirror (773) is placed on a translation stage, which therefore enables the optical path length of the reference arm to be adjusted relative to the optical path length of the sample arm. On the way back, the light is focused onto the reference arm edge (715) of the planar waveguide beamsplitter (709) in one dimension. In the other dimension, the light gets collimated by passing the cylindrical lens (771) a second time. An aperture (770) truncates the line of light. Within the planar waveguide beamsplitter (709) the light is recombined with the light from the sample arm. Since the light in the reference and sample arms traveled approximately the same distance, it interferes with each other and generates a 1D hologram at the detector edge (718) of the planar waveguide beam splitter.

Figure 12:
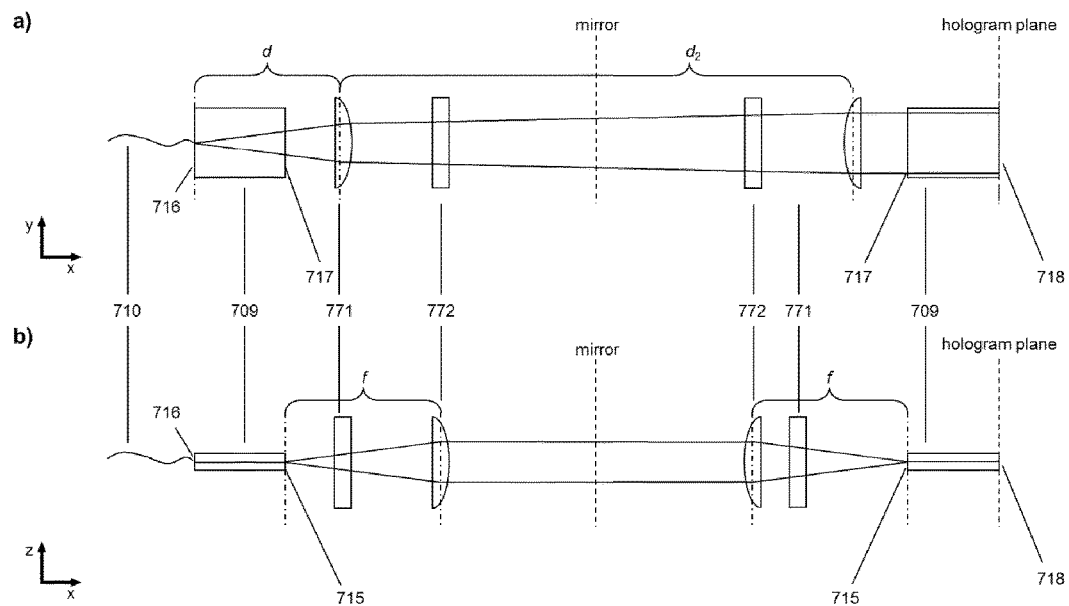
FIG. 12 illustrates an "unfolded" view of the reference light from the input fiber to the detection plan of the holographic line-field SS-OCT system illustrated in FIG. 11 in the horizontal (y-x) and vertical (z-x) planes.

FIG. 12 schematically illustrates the unfolded simplified reference light path for the system shown in FIG. 11 and described above. FIG. 12 a shows how the reference light propagates in the horizontal dimension (y-x plane) (i.e. top view) and FIG. 12 b shows how the reference light propagates in the vertical dimension (z-x plane) (i.e. side view).

Figure 13:
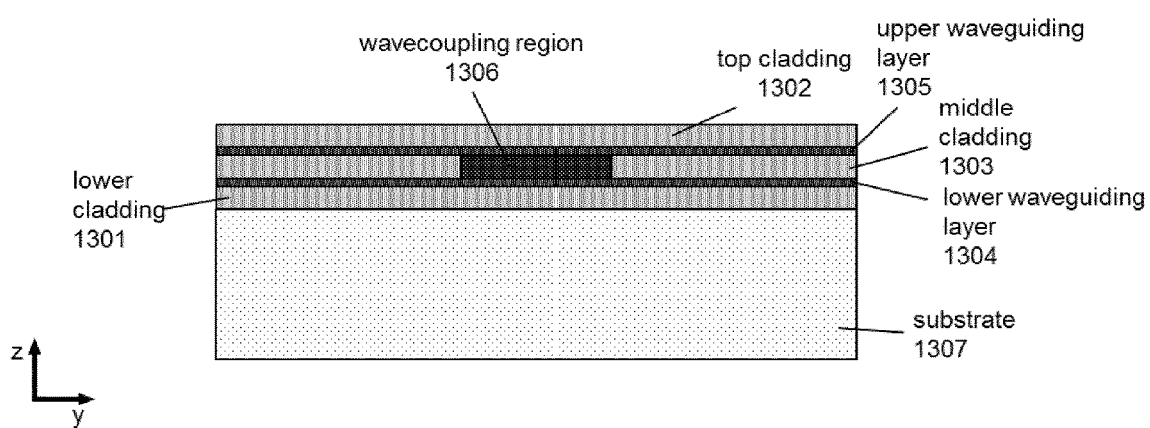
FIG. 13 illustrates an embodiment of a combined waveguide beamsplitter structure wherein two waveguiding layers are placed within close proximity and a wavecoupling region provides beamsplitting functionality.

FIG. 13 illustrates an alternative embodiment of a planar waveguide beamsplitter structure in which a beamsplitter is incorporated between two waveguiding layers in the z-y plane. A first lower planar waveguiding layer (1304) is placed parallel in close proximity to a second upper planar waveguiding layer (1305). Except within a wavecoupling region (1306), both layers are separated by a middle cladding layer (1303). A wave coupling region (1306) is defined where light couples from the first waveguide to the second waveguide. In this embodiment the refractive index of the wavecoupling region is matched to the refractive index of the waveguiding layers, whereas there is a larger difference in refractive index between the waveguiding layers (1304, 1305) and the cladding layers (1301, 1302, 1303). Alternatively, as described by Nishihara (Nishihara et al. "Optical Integrated Circuits", Chapter 26 of Electro-Optics Handbook $2^{nd}$ Edition. Waynant and Ediger editors. McGraw Hill 2000), spatial variations in the index of the wavecoupling region 1306 may be introduced to act as a grating to encourage directional coupling of light from one waveguiding layer to the other. All layers may be sitting on the same substrate (1307). The two waveguiding layers need not cover the same transverse extent in the x-y plane as edges could be used for beamguiding depending on the system configuration. The beamguiding could also be accomplished by introducing index structure variations within the waveguiding layer.

FIG. 14 illustrates how a planar waveguide beamsplitter structure of FIG. 13 could be incorporated in a line-field OCT system. The system is shown in the x-y plane as opposed to the z-y plane illustrated in FIG. 13. A swept optical frequency laser source (801) is coupled into a single mode fiber (802) which is split into two paths by a fiber beamsplitter (803). A first path (804) is coupled directly to a first (lower) waveguiding layer (820) of the planar beamsplitter structure (805). Light from this first path is propagated through the first waveguiding layer through a coupling region (806) having spatial variations, where a portion of the light is coupled to the second (upper) waveguiding layer (821) and discarded. The light which continues to propagate in the first waveguiding layer past the coupling region continues to propagate in two dimensions only until it forms a line at an air interface (807) of the first waveguiding layer. This line is imaged to a specified depth in the object (808) by a traditional rotationally symmetric optical system (809). A ray path (830) is drawn to illustrate a point to point imaging correspondence from locations at the air interface to locations within the object. The line in the object is likewise imaged back to the same air interface (807) of the planar waveguide structure and coupled back into the first (lower) waveguiding layer. A portion of the returning light is coupled into a second (upper) waveguiding layer (821) as it passes through the coupling region (806). The returning light in the second waveguiding layer continues to propagate until it is incident on a linear array detector (810). Light in a second or reference path (840) (from the second side of the fiber beamsplitter) is first passed through a variable length delay arm (811) before being coupled to the second waveguiding layer (821) of the planar beamsplitter structure (805). A portion of the light is coupled to the first waveguiding layer (820) of the beamsplitter and discarded while the rest continues to propagate in the second waveguiding layer (820) towards the linear array detector (810) where it interferes with the light returning from the object. The coupling structures in the planar waveguide beamsplitter, and the exact arrangements of input ports and output ports, (e.g., on which waveguide to couple fibers, vs. object) may be adjusted to achieve maximum efficiency. In FIG. 14, edges (825a, 825b) of the second waveguiding structure (821) are drawn to illustrate beamguiding by total internal reflection or reflective edge coating to show the coupling may occur from multiple sides of a structure. Similarly, single mode waveguides, reflective structures, lenses, etc. may be built into a waveguide to achieve similar purposes.

In some applications of interferometric imaging, it is advantageous to place a portion of the instrument in direct contact with the object to be imaged (see for example U.S. Pat. No. 6,564,087 and PCT Publication No. WO2012118958). This direct contact may serve to attenuate unwanted surface reflections from the object, constrain the geometry of an irregular surface, adjust the contrast or visibility of tissue layers by applying compression, or achieve a form factor of the instrument that cannot be achieved if light must have free space propagation between the instrument and the object to be imaged. In the present invention this may be achieved with exceptional simplicity by omitting optical component (809) which images the sample arm interface of the planar waveguide (807) into the object (808), and placing the sample arm interface of the planar waveguide directly in contact with or in very close proximity to the object to be imaged.

While the above interferometer configurations are optimized for a holographic line-field SS-OCT system, other interferometer configurations employing planar waveguides may prove beneficial for other line-field interferometric optical systems, such as but not limited to line-field SD-OCT systems, line-field SS-OCT systems, and line-field TD-OCT systems. In these cases, the optics are configured such that a line of light on the light scattering object is imaged to said planar waveguide in both dimensions, so that a point on the sample is imaged to a point on the waveguide. Such line-field methods will require specific optical designs in order to account for the astigmatism generated by a waveguide, when employed in the detection path. While the introduced astigmatism is desirable for holographic line-field OCT, one would likely choose to reverse the introduced astigmatism in other line-field configurations e.g. by the use of additional cylindrical lenses. Otherwise, the astigmatic detection may cause image blurring and a reduction in contrast for non-holographic imaging methods. Such systems may however already benefit by employing a planar waveguide as part of the illumination path, generating a clean single mode illumination.

Although various applications and embodiments that incorporate the teachings of the present application have been shown and described in detail herein, those skilled in the art can readily devise other varied embodiments that still incorporate these teachings.

The following references are hereby incorporated by reference:

Patent References

U.S. Pat. No. 7,602,501
U.S. application Ser. No. 13/745,632
U.S. Pat. No. 6,564,087
PCT Publication No. WO2012/118958
PCT Publication No. WO2012/143113
US Patent Publication No. 2012/0232535
PCT Publication No. WO2012/162809

Non-Patent Literature

Franke et al, "High resolution Holoscopy" Proc SPIE 8213 821324. (2012).
Huang et al. "Optical Coherence Tomography" Science 254 (5035): 1178 1991
Choma et al. "Sensitivity advantage of swept source and Fourier domain optical coherence tomography," Opt. Express 11, 2183-2189, 2003
Leitgeb et al. "Performance of Fourier domain vs. time domain optical coherence tomography," Opt. Express 11, 889-894, 2003
Nakamura et al. "High-speed three-dimensional human retinal imaging by line-field spectral domain optical coherence tomography" Optics Express 15(12), 7103-7116, 2007
Mujat et al. "Swept-source parallel OCT" Proceedings of SPIE 7168, 71681E, 2009
Lee et al. "Line-field optical coherence tomography using frequency-sweeping source" IEEE Journal of Selected Topics in Quantum Electronics 14(1), 50-55, 2008
Hillman et al. "Holoscopy—holographic optical coherence tomography: Optics Letters 36(13), 2390-2392, 2011
Kim M K "Tomographic three-dimensional imaging of a biological specimen using wavelength-scanning digital interference holography" Optics Express 7(9) 305-310, 2000
Cuche et al., "Spatial filtering for zero-order and twin-image elimination in digital off-axis holography," Appl. Opt. 39, 4070-4075, 2000.
Nishihara et al. "Optical Integrated Circuits", Chapter 26 of Electro-Optics Handbook $2^{nd}$ Edition. Waynant and Ediger editors. McGraw Hill 2000.
Mico et al., "Basic Principles and applications of digital holographic microscopy," in "Microscopy: Science, Technology, Applications and Education," Eds.: Mendez and Diaz 1411 (2010).
Zuluaga et al. "Spatially resolved spectral interferometry for determination of subsurface structure", Optics Letters 24, 519-521, 1999.
Grajciar et al. "Parallel Fourier domain optical coherence tomography for in vivo measurement of the human eye", Optics Express 13, 1131, 2005

The invention claimed is:

1. An interferometric imaging system for imaging a light scattering object comprising:
   a light source for generating a beam of radiation;
   a beam divider for separating the beam into reference and sample arms, wherein the sample arm contains the light scattering object to be imaged;
   one or more lenses arranged to create and project a line of light from said beam of radiation to the light scattering object to be imaged;
   a linear detector array arranged to receive light scattered from the object and light from the reference arm and generate signals in response thereto;
   a processor for generating an image in response to signals generated by the detector; and
   a planar waveguide positioned such that the line of light on the light scattering object is imaged to said planar waveguide in at least one dimension, said planar waveguide for reducing transverse modes in said one dimension.

2. The interferometric imaging system as recited in claim 1 wherein the beam divider also functions to combine light scattered from the object and light from the reference arm.

3. The interferometric imaging system as recited in claim 2 wherein the planar waveguide is positioned between the beam divider and the linear detector array.

4. The interferometric imaging system as recited in claim 3 further including a second planar waveguide positioned between the beam divider and the scattering object.

5. The interferometric imaging system as recited in claim 2 wherein the planar waveguide is positioned between the beam divider and the scattering object.

6. The interferometric imaging system as recited in claim 2 wherein the planar waveguide is formed integrally with the beam divider.

7. The interferometric imaging system as recited in claim 2, wherein the beam divider is formed by bonding together two planar waveguides.

8. The interferometric imaging system as recited in claim 2, wherein the beam divider is a reflection surface within the planar waveguide.

9. The interferometric imaging system of claim 1 further including a beam combiner arranged to combine light scattered from the object and light from the reference arm.

10. The interferometric imaging system of claim 9 wherein the planar waveguide is positioned between the beam combiner and the linear detector array.

11. The interferometric imaging system of claim 10 further including a second planar waveguide positioned between the beam combiner and the scattering object.

12. The interferometric imaging system of claim 9 wherein the planar waveguide is positioned between the beam combiner and the scattering object.

13. The interferometric imaging system of claim 9 wherein the planar waveguide is formed integrally with the beam combiner.

14. The interferometric imaging system as recited in claim 9, wherein the beam combiner is a reflection surface within the planar waveguide.

15. The interferometric imaging system as recited in claim 1, wherein the planar waveguide is bonded to the detector array.

16. The interferometric imaging system as recited in claim 1, wherein the light source is coupled into a single mode fiber and the planar waveguide is connected to said fiber.

17. An interferometric imaging system for imaging a light scattering object comprising:
   a light source for generating a beam of radiation;
   a beam divider for separating the beam into reference and sample arms, wherein the sample arm contains the light scattering object to be imaged, the beam divider also functioning to combine light scattered from the object and light from the reference arm;
   one or more lenses arranged to create and project a line of light from said beam of radiation to the light scattering object to be imaged;
   a linear detector array arranged to receive the combined light and generate signals in response thereto;
   a processor for generating an image in response to signals generated by the detector; and
   a planar waveguide positioned such that the line of light on the light scattering object is imaged to said planar waveguide in at least one dimension, said planar waveguide for reducing transverse modes in said one dimension, said planar waveguide being integrally formed with the beam divider.

18. The interferometric imaging system as recited in claim 17 wherein the planar waveguide is positioned between the beam divider and the linear detector array.

19. The interferometric imaging system as recited in claim 17 wherein the planar waveguide is positioned between the beam divider and the scattering object.

20. The interferometric imaging system as recited in claim 19 further including a second planar waveguide positioned between the beam divider and the detector array.

21. An interferometric imaging system for imaging a light scattering object comprising:
   a light source for generating a beam of radiation;
   a beam divider for separating the beam into reference and sample arms, wherein the sample arm contains the light scattering object to be imaged;
   one or more lenses arranged to create and project a line of light from said beam of radiation to the light scattering object to be imaged;
   a beam combiner arranged to combine light scattered from the object and light from the reference arm;
   a linear detector array arranged to receive the combined light and generate signals in response thereto;
   a processor for generating an image in response to signals generated by the detector; and
   a planar waveguide positioned such that the line of light on the light scattering object is imaged to said planar waveguide in at least one dimension, said planar waveguide for reducing transverse modes in said one dimension, said planar waveguide being integrally formed with the beam combiner.

22. The interferometric imaging system as recited in claim 21 wherein the planar waveguide is positioned between the beam combiner and the linear detector array.

23. The interferometric imaging system as recited in claim 21 wherein the planar waveguide is positioned between the beam combiner and the scattering object.

24. The interferometric imaging system as recited in claim 23 further including a second planar waveguide positioned between the beam combiner and the detector array.

* * * * *

UNITED STATES PATENT AND TRADEMARK OFFICE
CERTIFICATE OF CORRECTION

PATENT NO. : 10,113,856 B2
APPLICATION NO. : 15/025410
DATED : October 30, 2018
INVENTOR(S) : Matthew J. Everett et al.

It is certified that error appears in the above-identified patent and that said Letters Patent is hereby corrected as shown below:

In the Specification

In Column 2, Line 14, delete "2007Mujat" and insert -- 2007; Mujat --, therefor.

Signed and Sealed this
Sixteenth Day of July, 2019

Andrei Iancu
*Director of the United States Patent and Trademark Office*